US012693669B2

(12) United States Patent
Schnitzer et al.

(10) Patent No.: US 12,693,669 B2
(45) Date of Patent: Jul. 28, 2026

(54) METHOD FOR CREATING AN ENVIRONMENT MAP AND MOBILE, SELF-MOVING APPLIANCE

(71) Applicant: BSH Hausgeräte GmbH, Munich (DE)

(72) Inventors: Frank Schnitzer, Bad Neustadt (DE); Stefan Hassfurter, Maroldsweisach (DE)

(73) Assignee: BSH Hausgeräe GmbH, Munich (DE)

( * ) Notice: Subject to any disclaimer, the term of this patent is extended or adjusted under 35 U.S.C. 154(b) by 177 days.

(21) Appl. No.: 18/447,337

(22) Filed: Aug. 10, 2023

(65) Prior Publication Data

US 2024/0069565 A1      Feb. 29, 2024

(30) Foreign Application Priority Data

Aug. 26, 2022    (DE) ...................... 10 2022 208 869.7

(51) Int. Cl.
G05D 1/00          (2024.01)
(52) U.S. Cl.
CPC ......... G05D 1/0274 (2013.01); G05D 1/0227 (2013.01); G05D 1/0238 (2013.01)
(58) Field of Classification Search
CPC .. G05D 1/0274; G05D 1/0227; G05D 1/0238; G05D 2105/10; G05D 2107/40; G05D 2109/10; G05D 2111/17; G05D 1/241; G05D 1/242; G05D 1/246; G01C 21/3848; G01C 21/3837; A47L 9/2805; A47L 9/009; A47L 9/2852;

(Continued)

(56) References Cited

U.S. PATENT DOCUMENTS

| | | | |
|---|---|---|---|
| 5,684,695 | A | 11/1997 | Bauer |
| 11,269,350 | B2 | 3/2022 | Hillen |
| 2016/0027207 | A1 | 1/2016 | Hillen et al. |

(Continued)

FOREIGN PATENT DOCUMENTS

| | | |
|---|---|---|
| DE | 102016124856 A1 | 6/2018 |
| DE | 102017220180 A1 | 5/2019 |

(Continued)

OTHER PUBLICATIONS

KR20230109424A—english description—Moving robot Controlling method for the moving robot and Controlling system for the moving robot (Year: 2023).*

*Primary Examiner* — Abby Lin
*Assistant Examiner* — Renee LaRose
(74) *Attorney, Agent, or Firm* — Laurence A. Greenberg; Werner H. Stemer; Ralph E. Locher

(57)          ABSTRACT

A method creates an environment map of a surrounding region for the operation of a mobile, self-moving appliance, in particular a floor cleaning appliance such as a vacuum cleaning and/or sweeping and/or mopping robot. The method includes: detecting the region around the appliance with at least one first sensor, to create a first horizontal plane of the environment map; detecting the region around the appliance with at least one second sensor, to create a second horizontal plane of the environment map, which is different from the first horizontal plane; and planning a movement path of the appliance based on the first and second planes of the environment map, in order in particular to achieve the maximum floor processing possible in the surrounding region.

11 Claims, 3 Drawing Sheets

(58) Field of Classification Search
CPC .............. A47L 11/4002; A47L 11/4011; A47L
11/4061; A47L 2201/04
See application file for complete search history.

(56) References Cited

U.S. PATENT DOCUMENTS

| | | | |
|---|---|---|---|
| 2019/0324473 A1 * | 10/2019 | Hillen | ................... G05D 1/0219 |
| 2020/0272165 A1 | 8/2020 | Ran et al. | |
| 2022/0061616 A1 | 3/2022 | Yoon et al. | |

FOREIGN PATENT DOCUMENTS

| | | | | |
|---|---|---|---|---|
| EP | 3549726 A2 | * | 10/2019 | ........... A47L 9/2805 |
| KR | 20230109424 A | * | 1/2022 | |
| WO | 2019114221 | | 6/2019 | |

* cited by examiner

Fig. 1A
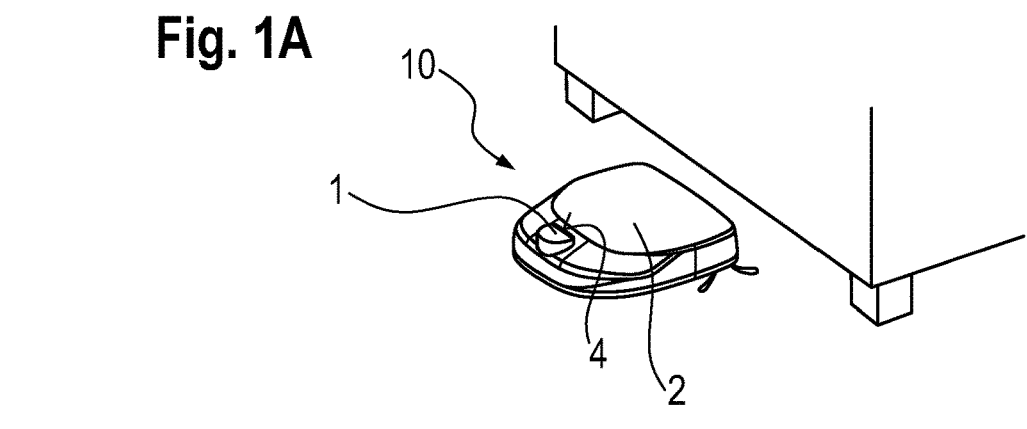
Fig. 1B
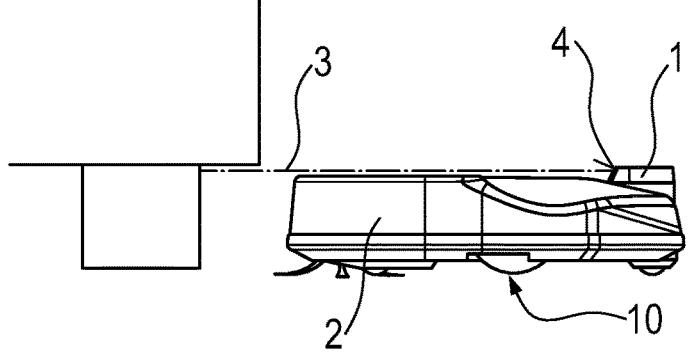
Fig. 1C
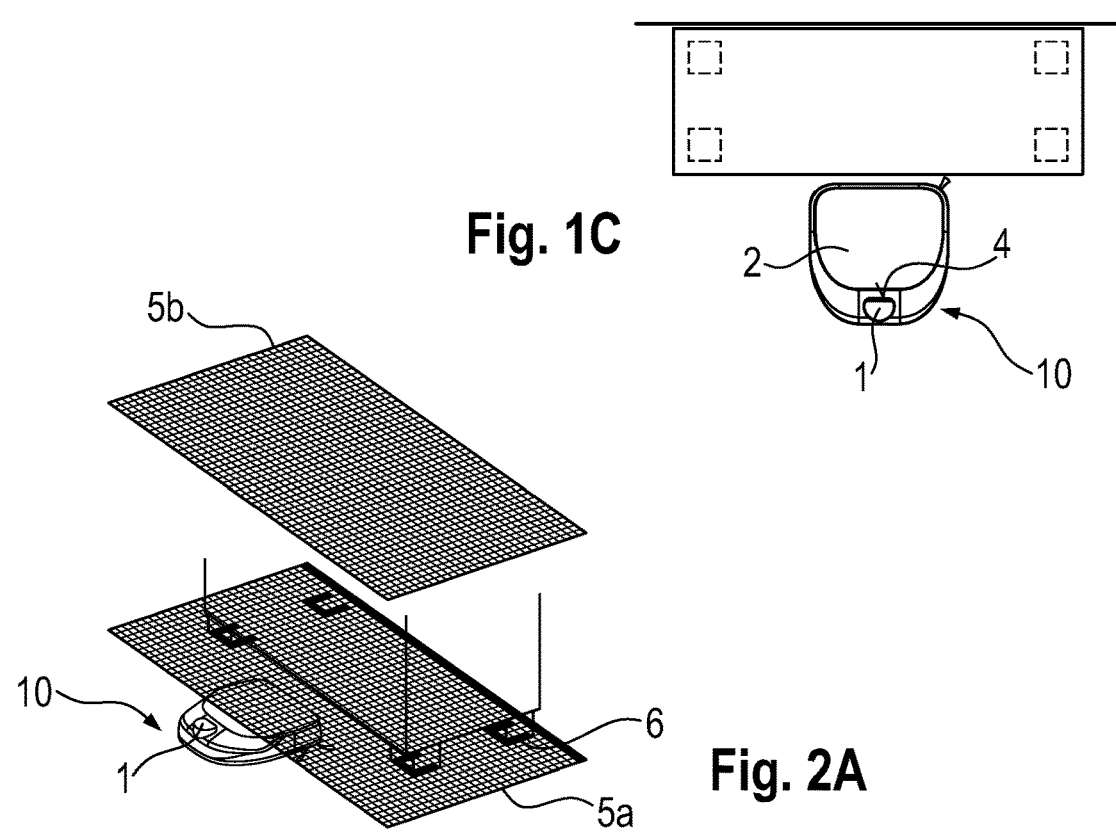
Fig. 2A

Fig. 4A
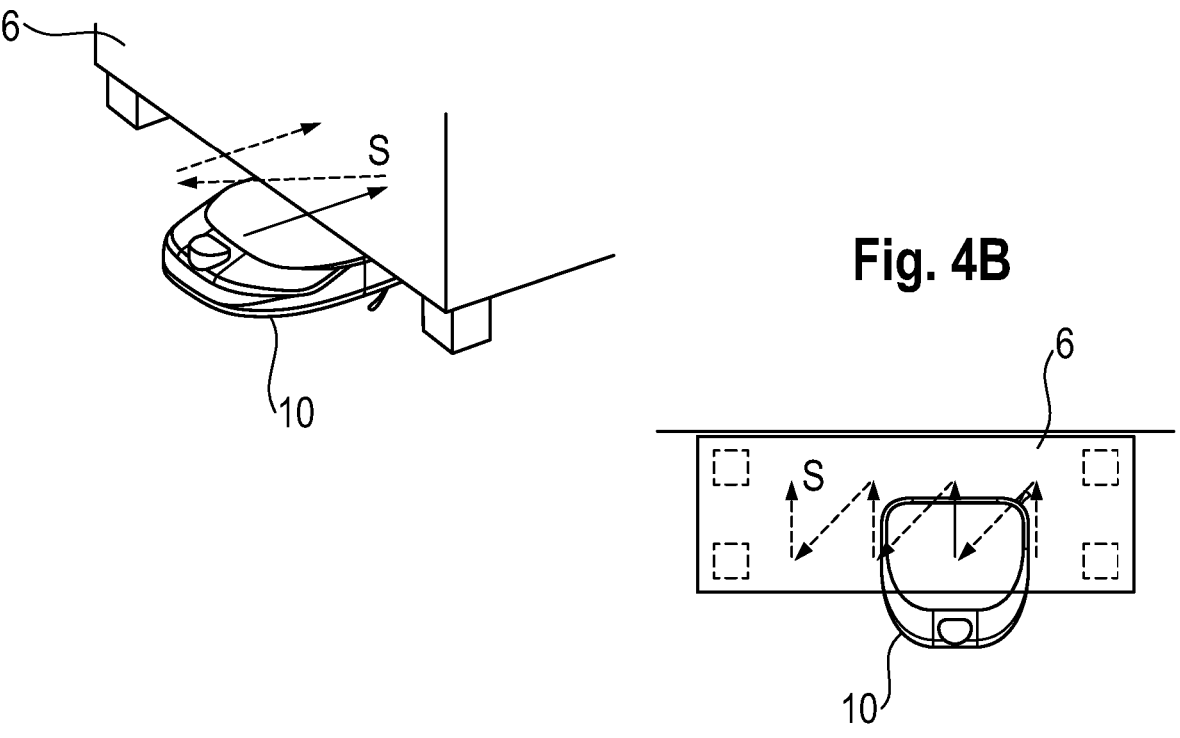
Fig. 4B
Fig. 5
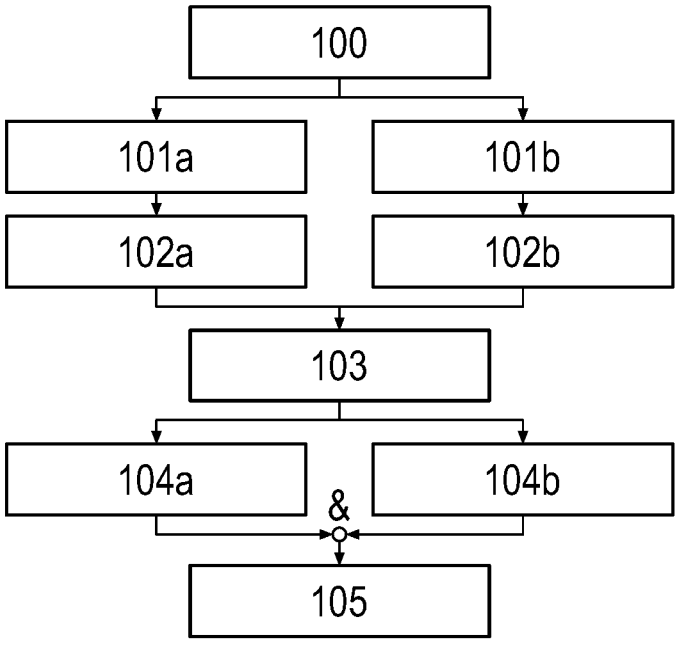

METHOD FOR CREATING AN ENVIRONMENT MAP AND MOBILE, SELF-MOVING APPLIANCE

CROSS-REFERENCE TO RELATED APPLICATION

This application claims the priority, under 35 U.S.C. § 119, of German Patent Application DE 10 2022 208 869.7, filed Aug. 26, 2022; the prior application is herewith incorporated by reference in its entirety.

FIELD AND BACKGROUND OF THE INVENTION

The invention relates to a method for creating an environment map of a surrounding region for the operation of a mobile, self-moving appliance, in particular a floor cleaning appliance, such as a vacuum cleaning and/or sweeping and/or mopping robot, as well as a mobile, self-moving appliance that comprises such a method.

Mobile, self-moving appliances, for example robot vacuum cleaners, are required to clean as much of an entire floor surface as possible autonomously. To do this, such robot vacuum cleaners detect their environment by means of sensors in order to move autonomously, without striking obstacles, to determine ideal movement paths and to clean an optimal, in particular maximum portion of the floor processing region to be cleaned. As well as the bumper, already known to the person skilled in the art, which can detect collisions with obstacles at the level of an appliance body, robot vacuum cleaners are also frequently equipped with a lidar sensor, which scans the robot's environment contactlessly generally with a 360° field of view and from a distance of several meters to input the measurement values into an environment map. Integration of the lidar sensor is predominantly achieved in the form of a tower-type structure on the appliance housing, so the lidar sensor has a free field of view above the robot vacuum cleaner appliance body.

It is then possible for there to be a surrounding region above and/or below a measurement plane of the lidar sensor, which is not detected either by the lidar sensor or the bumper with the risk that the robot vacuum cleaner will strike obstacles, objects and furniture. Also, the robot vacuum cleaner with the lidar tower is unable to pass below obstacles at the level of the lidar sensor. However, it is possible for the robot vacuum cleaner to clean at least an edge region of such obstacles, in particular if the lidar tower is arranged away from the cleaning system on the robot vacuum cleaner.

It is known for the lidar sensor also to be equipped with a separate, dedicated bumper. When the robot vacuum cleaner with its lidar bumper strikes an obstacle, the robot vacuum cleaner according to the prior art moves back a little and tries to pass again a few centimeters to the side. This movement response is repeated until the robot vacuum cleaner finds a path, on which it can reach its destination without striking anything. Conventional robot vacuum cleaners have no memory of the regions where the lidar bumper detected an object. In a further movement maneuver along corresponding paths the robot vacuum cleaners therefore strike the respective obstacle again with the lidar sensor.

SUMMARY OF THE INVENTION

It is the object of the invention to be able to create an environment map that ensures a logical evaluation of given ambient situations and in particular ensures that repeated collisions are avoided while guaranteeing that accessible surfaces are cleaned.

The object is achieved by a method for creating an environment map of a surrounding region for the operation of a mobile, self-moving appliance having the features of the independent method claim. The object is also achieved by a mobile, self-moving appliance having the features of the independent mobile, self-moving appliance claim. Advantageous configurations and developments are set out in the subclaims.

According to the invention with a method for creating an environment map of a surrounding region for the operation of a mobile, self-moving appliance, in particular a floor cleaning appliance, such as a vacuum cleaning and/or sweeping and/or mopping robot, the region around the appliance is detected using at least one first sensor, to create a first horizontal plane of the environment map. The region around the appliance is then detected using at least one second sensor, to create a second horizontal plane of the environment map, which is different from the first horizontal plane. A movement path is planned for the appliance based on the first and second planes of the environment map, in order in particular to achieve the maximum floor processing possible in the surrounding region.

In the present instance therefore a second plane of the environment map is introduced for obstacle detection in order to be able to evaluate which floor regions are not accessible for an appliance body of the appliance and therefore cannot be cleaned and which floor regions are not passable for the first and/or second sensor only. Appropriate mission and path planning then allows floor regions in proximity to obstacles to be cleaned systematically and in particular optimally.

For example, the appliance body is significantly lower than the first and/or second sensor. The first sensor is for example a lidar sensor, which is arranged on the appliance body in a rear region of the appliance. A front region of the appliance can then reach and in particular also clean floor regions, where the appliance with only the lidar sensor would collide with obstacles.

These obstacles, below which it is possible to move to at least some degree, are stored in the second plane of the environment map. This advantageously allows the repeated striking of the obstacles with the lidar sensor to be avoided. Differentiation between obstacles at the level of the appliance body (first horizontal plane) and obstacles at the level of the lidar sensor (second horizontal plane) advantageously allows repeatable movement to some degree below obstacles, increasing the accessible or cleanable portion of the entire floor region. The specific evaluation of the two planes of the environment map allows optimized planning of defined movement maneuvers against or along obstacles.

A mobile, self-moving appliance refers in particular to a floor cleaning appliance, which processes floor surfaces autonomously in particular in a household context. These include inter alia vacuum cleaning, mopping and/or sweeping robots, for example robot vacuum cleaners and/or robot lawn mowers. During operation (cleaning or cutting operation) such appliances preferably operate without or with as little user intervention as possible. For example the appliance moves independently in a predefined space in order to clean the floor according to a predefined and preprogrammed procedural strategy.

The floor surface to be processed refers to any spatial surface to be cleaned. These include inter alia subregions of individual spaces, individual surfaces of a home, individual rooms of a home and/or the entire floor surface of the complete home or living space.

In order to be able to take into account any individual particularities of the environment, an exploratory journey preferably takes place with the mobile, self-moving appliance. An exploratory journey refers in particular to a reconnaissance, which is suitable for exploring a floor surface to be processed to determine obstacles, spatial divisions and the like, and in particular to detect the region around the appliance. The purpose of an exploratory journey is in particular to be able to assess and/or show conditions of the floor processing region to be processed.

After the exploratory journey the mobile, self-moving appliance knows its environment and can transmit it to the user in the form of the environment map, for example to a mobile device in an app. In the environment map the user can be offered the possibility of interacting with the mobile, self-moving appliance. The user can advantageously see information in the environment map and change and/or adapt it as required.

An environment map refers in particular to any map, which is suitable for showing the environment of the floor processing region with all its obstacles and objects. For example, the environment map shows the floor processing region with the walls and furniture contained therein in the manner of a sketch. The environment map here comprises the first and second horizontal planes, which are in particular aligned horizontally in relation to the floor surface and run substantially parallel to one another. Each plane here shows its own height-relevant obstacles and objects, so the planes differ at least in parts.

Obstacles refer to any objects and/or items arranged, for example lying or standing, in a floor processing region and affecting, in particular impeding and/or interfering with, processing by the mobile, self-moving appliance, for example furniture, walls, curtains, carpets and the like.

The environment map with obstacles is preferably shown in the app on a portable auxiliary device. This serves in particular to allow visualization for possible interaction for the user.

An auxiliary device here refers in particular to any device that a user can carry and which is located outside the mobile, self-moving appliance, in particular is external to and/or differentiated from the mobile, self-moving appliance, and is suitable for displaying, providing, conveying and/or transmitting data, for example a mobile phone, smart phone, tablet and/or a computer or laptop.

An app, in particular a cleaning app, is preferably installed on the portable auxiliary device, serving to link the mobile, self-moving appliance to the auxiliary device and in particular allowing visualization of the floor processing region, in other words the living space to be cleaned or the home or region of the home to be cleaned. The app preferably shows the user the region to be cleaned as an environment map along with any obstacles.

An appliance housing refers in particular to the outer housing of the appliance, which closes the appliance off from the outside. The inner workings of the appliance are therefore located in the interior of the appliance housing. The first sensor projects beyond the appliance housing, for example in a vertical direction, in other words the z-direction. For example, the first sensor is arranged on an upper face in a rear or central region of the appliance housing.

A first and second sensor refers in particular to any sensor, which is suitable for detecting obstacles, preferably in a reliable manner. It is preferably tactile, read-capable, touch sensitive, laser-based and/or camera-based. The first sensor is preferably a LIDAR sensor and/or a laser tower, which reads or scans its environment in a horizontal plane by a 360° rotation. The first sensor emits measurement beams, in particular laser beams, at regular intervals, these being used for distance measurement. Rotation of the first sensor takes place about a rotation axis, in particular a z-axis, relative to the appliance housing and is brought about by a motor. The second sensor is preferably a bumper, which is arranged on the lidar sensor or on the appliance body (lidar bumper). It preferably detects obstacles and objects on contact, so that obstacles at the level of the lidar sensor can be reliably detected, even if the lidar sensor itself cannot detect the obstacles.

A horizontal plane refers in particular to any plane running parallel to the floor surface and in a horizontal and/or level direction. In particular the horizontal plane runs parallel to the upper face of the appliance housing. The first horizontal plane is preferably a short distance, in other words just above the upper face of the appliance housing. The second horizontal plane preferably extends above the first plane at the topmost level of the lidar sensor.

A movement path refers in particular to a planned travel movement of the appliance, with the aim of including the maximum floor processing possible in the region around the appliance. The maximum floor processing possible here refers to optimum processing in the greatest possible floor region, in other words even to some degree below obstacles and objects, if the appliance body height of the appliance allows this (regardless of the level of the lidar sensor).

In one advantageous embodiment paths below obstacles under which movement is possible at least to some degree are integrated in the movement path. In particular regions below obstacles, below which movement is not possible with the first sensor, in particular the lidar sensor, due to the level of the lidar sensor, but which are higher than the appliance housing and therefore allow the appliance housing to pass below, can thus be partially cleaned. A nozzle with brush roller of the appliance, used to clean the floor, is advantageously located on a side of the appliance housing opposite the first sensor, ensuring optimum cleaning of the floor. This allows the nozzle to reach and clean floor regions where the appliance with its lidar sensor would collide with the obstacle.

In a further advantageous embodiment the first plane and the second plane are at different levels above the floor. In particular the first plane is closer to the floor than the second plane. The first plane therefore contains obstacles that are closer to the floor than the second plane. The first plane therefore includes and shows obstacles that are lower than the obstacles of the second plane. The planes of the environment map therefore differ in content, in particular due to the obstacles that are input at different levels.

In a further advantageous embodiment the first plane contains obstacles, which cannot be passed by an appliance body of the appliance and the second plane contains obstacles, which cannot be passed by the second sensor. The obstacles of the second plane can preferably be passed by the appliance body. For example measurement results of the lidar sensor (first sensor) and/or collision results of a bumper, arranged on a front face of the appliance housing, are input in the first plane. The second plane includes collision results of the lidar bumper (second sensor). The two separate planes therefore allow clear differentiation of which obstacles occur at which level (appliance housing level or lidar sensor level).

In a further advantageous embodiment the movement path is a collision-free path. The movement path here is preferably planned such that the appliance body moves below the obstacles of the second plane at least to some degree. In particular after the creation of the second plane a travel plan is executed to create the movement path of the appliance. To this end every point to be crossed on one of the planned trajectories in both planes of the environment map is checked for a movement path. In the first plane it is checked whether the appliance body can pass or move below obstacles and in the second plane whether the lidar sensor can pass by or move below the obstacles. The evaluation here is carried out for example separately and linked with an "AND" criterion for programming purposes in order to achieve the collision-free movement path. This linked evaluation of both planes now allows the appliance automatically to travel along, move below and therefore clean the maximum floor surface while still avoiding obstacles for the lidar sensor.

In a further advantageous embodiment for movement below the movement path of the appliance corresponds to a sawtooth pattern. The planned movement path allows the appliance to clean regions below obstacles, for example furniture, such as front regions below sofas or cabinets, by means of specific travel. A specific evaluation of the regions not covered by standard movement patterns, for example "move along edges" or "meander to clean space", allows inter alia specific movement maneuvers for the appliance. Regions below which movement is possible to some degree are cleaned for example not by movement along the side but by a sawtooth pattern, in which the appliance moves repeatedly forward below the obstacle, then withdraws and moves below the obstacle again a little to the side.

In a further advantageous embodiment the first sensor is a lidar sensor on the appliance body and/or a bumper on the appliance body, and the second sensor is a bumper for the lidar sensor and/or an optical sensor on the lidar sensor. In particular the second sensor and therefore of necessity the creation of the second plane are not restricted to collision events with the first sensor, in other words the lidar sensor. Camera systems or other measurement systems at the level of the lidar sensor can also be used alternatively or additionally to populate the second plane of the environment map with data, thereby making said plane even more accurate. The second sensor here can be mounted or fastened directly onto the lidar sensor or the appliance body at the detection level of the second plane.

The invention also relates to a mobile, self-moving appliance, in particular a floor cleaning appliance for the autonomous processing of floor surfaces, such as a vacuum cleaning and/or sweeping and/or mopping robot, comprising an appliance body, an evaluation unit, a first sensor and a second sensor. The first sensor is arranged on the appliance body such that it detects a first horizontal plane of a surrounding region. The second sensor is arranged on the first sensor and/or on the appliance body such that it detects a second horizontal plane of the surrounding region, which is different from the first horizontal plane. The evaluation unit creates an environment map based on the first horizontal plane and the second horizontal plane and based on this a movement path of the appliance with maximum possible floor processing in the surrounding region.

Features, configurations, embodiments and advantages relating to the method also apply in the context of the inventive appliance and vice versa.

Other features which are considered as characteristic for the invention are set forth in the appended claims.

Although the invention is illustrated and described herein as embodied in a method for creating an environment map, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 1A-1C are schematic views of an exemplary embodiment of a mobile, self-moving appliance, suitable for performing the inventive method;

FIGS. 2A-2C are schematic views of an exemplary embodiment of an inventive method for creating an environment map;

FIGS. 4A and 4B are schematic views of an exemplary embodiment of a mobile, self-moving appliance, suitable for performing the inventive method; and FIG. 5 is a flow diagram of an exemplary embodiment of an inventive method for creating an environment map.

DETAILED DESCRIPTION OF THE INVENTION

Figure 2B:
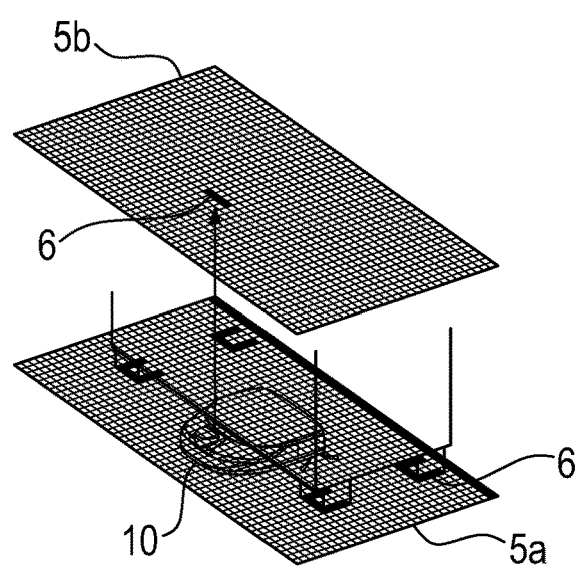

Referring now to the figures of the drawings in detail and first, particularly to FIGS. 1A-1C thereof, there is shown a mobile, self-moving appliance, in particular a robot vacuum cleaner 10, which is cleaning, in particular vacuum cleaning, a floor. In order to be aware of its environment for this purpose, to be able to move autonomously without striking obstacles, to be able to determine ideal movement paths for cleaning journeys and to be able to clean a maximum portion of the floor surface to be cleaned, the robot vacuum cleaner 10 has a first sensor, in particular a lidar sensor 1. The lidar sensor 1 is arranged on an appliance body 2 in a rear central region of the appliance body 2 and scans a first horizontal plane 3 of the environment just above an upper face of the appliance body (see FIG. 1B) in a 360° field of view of the robot vacuum cleaner. The measurement values detected in this process are input into an environment map. The lidar sensor 1 in particular has a tower-type structure on the appliance body 2, so that the lidar sensor 1 has a free field of view above the appliance body 2.

In addition to the lidar sensor 1 the robot vacuum cleaner 10 can have a bumper on the appliance body 2 (not shown). This appliance bumper detects obstacles and objects below the measurement plane of the lidar sensor 1. In particular the appliance bumper strikes objects and furniture that were not detected previously by the lidar sensor 1, in other words in particular very flat obstacles, for example shoes, toys, skirting boards and the like.

Even if the robot vacuum cleaner 10 with its lidar sensor 1 cannot move in its entirety under all obstacles, below which a robot vacuum cleaner without a comparable tower structure can move, it is still possible for the robot vacuum cleaner 10 to clean at least edge regions below the obstacles, which although too low for the lidar sensor 1 are not too low for the appliance body 2. The measurement values of the individual obstacle sensors are evaluated so that cleaning takes place in a specific and systematic manner and in particular to a maximum degree.

In particular the robot vacuum cleaner 10 has a second sensor for this purpose, configured as a bumper on the lidar sensor (lidar bumper 4). The lidar bumper 4 detects obstacles in the environment located in a second plane above the first plane 3. The second plane is incorporated as a further plane in the environment map. The second plane here comprises only measurement values detected by the lidar bumper 4. In combination with the first plane, which comprises the measurement values of the appliance bumper and/or the lidar sensor it is advantageously possible to evaluate not only where the robot vacuum cleaner 10 cannot plan a movement path as it would strike an obstacle but also how the robot vacuum cleaner 10 must move to clean systematically and to the maximum possible below an obstacle that it can move below to some degree.

FIG. 1A shows an isometric view of a robot vacuum cleaner 10, which has the bumper 4 in the lidar sensor 1, which detects obstacles that are not detected by the lidar sensor 1 but may lead to collisions with the lidar sensor 1. FIG. 1B shows a side view of this. FIG. 1C shows a plan view of FIGS. 1A and 1B.

Figure 2C:
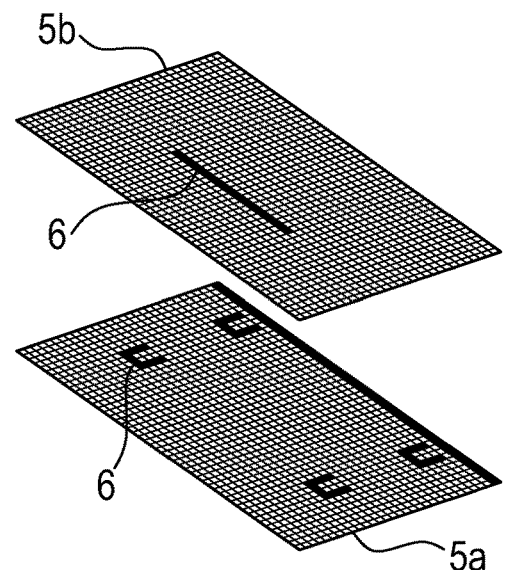

FIGS. 2A, 2B and 2C show the method for populating the first plane 5a and second plane 5b with detected obstacles, to create the inventive environment map. Input into the first plane 5a are all the measurement results of the lidar sensor and optionally collision events of the appliance bumper arranged on a front face of the appliance housing. Collision events of the lidar bumper are input into the second plane 5b.

During an exploratory journey the first plane 5a is populated first, as the lidar sensor scans the environment constantly. When there is contact between an obstacle and the lidar bumper, obstacles are input into the second plane 5b. At the start of the exploratory journey the second plane 5b is only sparsely populated (see FIGS. 2A, 2B). As it travels systematically over the floor surfaces during cleaning journeys the robot vacuum cleaner comes into increasingly frequent contact with obstacles 6, the clearance height of which leads to a collision with the lidar sensor 1. As the number of cleaning journeys increases and with every new collision with an obstacle 6 the second plane 5b is expanded and therefore better reflects the environment. The two planes of the environment map allow differentiation of which obstacles occur at which level (robot level or lidar level).

FIGS. 2A to 2C show progressive knowledge of the environment and the associated progressive population of the second plane 5b. FIG. 2B shows the robot vacuum cleaner 10, the obstacles 6 and the superimposed planes 5a, 5b of the current environment map. FIG. 2C shows the final environment map after multiple detections. It can be clearly differentiated for the robot vacuum cleaner which obstacles 6 affect the appliance body and which obstacles 6 affect the lidar sensor.

An optimal movement path can be performed after the introduction of the second plane 5b. To this end every point to be crossed for each path on the planned trajectory is checked in both planes 5a, 5b. In the first plane 5a it is checked whether the robot vacuum cleaner can pass all the obstacles 6. In the second plane 5b it is checked whether the lidar sensor passes the obstacles. For example, for optimal movement path planning separate evaluations are used, which are linked for programming purposes with an "AND" criterion to achieve a collision-free path. This joint evaluation of both planes 5a, 5b advantageously allows the robot vacuum cleaner to move automatically over and in particular to clean the maximum floor surface possible, while still avoiding obstacles 6 for the lidar sensor.

As a result the robot vacuum cleaner 10 is able to clean specific regions below obstacles such as furniture, for example the front region below sofas or cabinets, by means of a specific journey.

Figure 3A:
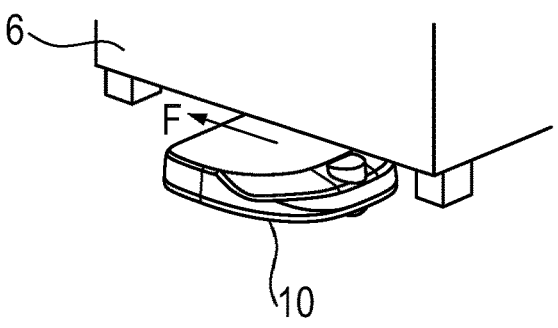
FIGS. 3A and 3B are schematic views of an exemplary embodiment of a mobile, self-moving appliance according to the prior art.
Figure 3B:
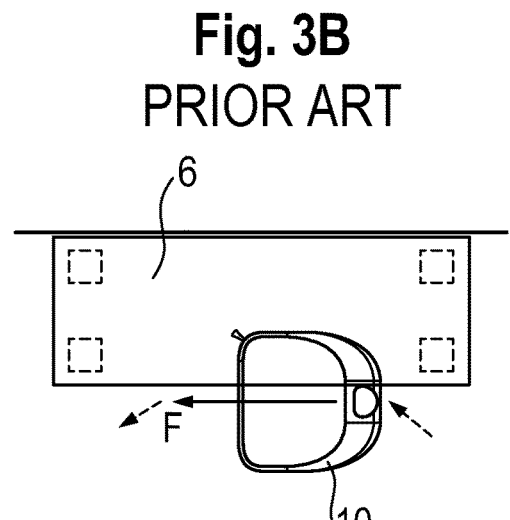

FIGS. 3A and 3B show a standard movement pattern F, in particular movement along edges of the obstacles 6. The robot vacuum cleaner 10 here only just passes below the obstacle 6 to clean along the obstacle 6. Maximum cleaning, in particular in regions below the obstacle 6, is therefore not possible.

FIGS. 4A and 4B in contrast show a specific journey of the robot vacuum cleaner based on the two planes of the environment map. Specific evaluation allows specific movement maneuvers, during which the relevant floor surfaces are not only cleaned by movement along the sides, as shown in FIGS. 3A and 3B. The specific movement maneuver comprises a sawtooth pattern S for example, in which the robot vacuum cleaner repeatedly moves forward below the obstacle 6, then withdraws and moves back below the obstacle 6 a little to the side, as shown in FIGS. 4A and 4B. This allows the robot vacuum cleaner 10 to push its nozzle as far back as possible below the obstacles 6, thereby ensuring maximum floor cleaning even below obstacles 6.

FIG. 5 shows a flow diagram of environment map creation based on two planes and movement path planning. In step 100 the robot vacuum cleaner performs an exploratory or cleaning journey. In the process the robot vacuum cleaner identifies an obstacle with its lidar sensor or appliance bumper (step 101a) and inputs the detected obstacle into the first plane of the environment map (step 102a). When the robot vacuum cleaner identifies an obstacle with the lidar bumper (step 101b), the robot vacuum cleaner inputs the detected obstacle into the second plane of the environment map (step 102b). The robot vacuum cleaner then plans its optimal or maximum movement path as a function of the created first and second planes (step 103). In particular the robot vacuum cleaner checks the planned movement path on the first plane of the environment map (step 104a). The robot vacuum cleaner also checks the planned movement path on the second plane of the environment map (step 104b). The robot vacuum cleaner then follows the planned route to perform its cleaning operation (step 105).

The invention claimed is:

1. A method for creating an environment map of a surrounding region for an operation of a mobile, self-moving appliance, which comprises the steps of:

detecting a region around the mobile, self-moving appliance with at least one first sensor including a lidar sensor, to create a first horizontal plane of the environment map, the first horizontal plane containing obstacles which cannot be passed by an appliance body of the mobile, self-moving appliance, the first horizontal plane being above the upper face of the appliance body of the mobile, self-moving appliance;

inputting all measurement results of the lidar sensor into the first horizontal plane;

detecting the region around the mobile, self-moving appliance with at least one second sensor including a lidar bumper, to create a second horizontal plane of the environment map, which is different from the first horizontal plane and above the first horizontal plane at a topmost level of the first sensor, the second horizontal plane including only measurement values detected by the lidar bumper for providing clear differentiation of which obstacles occur at which level, the second horizontal plane containing obstacles, which cannot be passed by the at least one second sensor, wherein the obstacles of the second horizontal plane can be passed by the appliance body; and planning a movement path of the mobile, self-moving appliance based on separate evaluations of the first and second horizontal planes of the environment map by checking every point to be crossed on one of a plurality of planned trajectories in both the first and second horizontal planes of the environment map for a movement path by checking in the first horizontal plane whether the appliance body can pass or move below obstacles and by checking in the second horizontal plane whether the lidar sensor can pass or move below the obstacles;

carrying out the evaluations separately and linked with an "AND" criterion for programming purposes in order to make the movement path collision-free, and in order to achieve a maximum floor processing possible in the surrounding region.

2. The method according to claim 1, wherein paths below the obstacles below which movement is possible are at least partially integrated in the movement path.

3. The method according to claim 1, wherein the first horizontal plane and the second horizontal plane are at different levels above a floor.

4. The method according to claim 1, wherein the movement path is a collision-free path.

5. The method according to claim 1, wherein the movement path is planned such that the appliance body can move below the obstacles of the second horizontal plane.

6. The method according to claim 5, wherein for movement below, the movement path of the appliance corresponds to a sawtooth pattern.

7. The method according to claim 1, wherein the at least one first sensor is on the appliance body of the mobile, self-moving appliance and/or a bumper on the appliance body, and the at least one second sensor includes an optical sensor on the lidar sensor.

8. The method according to claim 1, wherein the mobile, self-moving appliance is a floor cleaning appliance or a vacuum cleaning and/or sweeping and/or mopping robot.

9. A mobile, self-moving appliance, comprising:

an appliance body;

a first sensor including a lidar sensor disposed on said appliance body for detecting a first horizontal plane of a surrounding region, the first horizontal plane containing obstacles which cannot be passed by said appliance body, the first horizontal plane being above the upper face of the appliance body of the mobile, self-moving appliance;

said lidar sensor inputting all measurement results into the first horizontal plane;

a second sensor including a lidar bumper, said second sensor disposed on said first sensor and/or on said appliance body for detecting a second horizontal plane of the surrounding region, which is different from the first horizontal plane and above the first horizontal plane at a topmost level of the first sensor, the second horizontal plane including only measurement values detected by said lidar bumper for providing clear differentiation of which obstacles occur at which level, the second horizontal plane containing obstacles, which cannot be passed by said at least one second sensor, wherein the obstacles of the second horizontal plane can be passed by said appliance body; and an evaluation unit for creating an environment map based on separate evaluations of the first horizontal plane and the second horizontal plane by checking every point to be crossed on one of a plurality of planned trajectories in both the first and second horizontal planes of the environment map for a movement path by checking in the first horizontal plane whether said appliance body can pass or move below obstacles and by checking in the second horizontal plane whether said lidar sensor can pass or move below the obstacles, the evaluations being carried out separately and linked with an "AND" criterion for programming purposes in order to make the movement path collision-free with maximum possible floor processing in the surrounding region.

10. The mobile, self-moving appliance according to claim 9, wherein the mobile, self-moving appliance is a floor cleaning appliance for an autonomous processing of floor surfaces.

11. The mobile, self-moving appliance according to claim 10, wherein the floor cleaning appliance is a vacuum cleaning and/or sweeping and/or mopping robot.

* * * * *